United States Patent
Uemura

[11] Patent Number: 6,142,312
[45] Date of Patent: Nov. 7, 2000

[54] MEMBRANE SEPARATION DEVICE WITH MEMBRANE MODULE AND WASHING APPARATUS THEREFOR

[75] Inventor: Keiji Uemura, Tokyo, Japan

[73] Assignee: Kurita Water Industries Ltd., Tokyo, Japan

[21] Appl. No.: 09/175,349

[22] Filed: Oct. 20, 1998

[30] Foreign Application Priority Data

Nov. 6, 1997 [JP] Japan .................................. H9-304334

[51] Int. Cl.[7] .................................................. B01D 63/10
[52] U.S. Cl. ............... 210/411; 210/321.75; 210/321.76; 210/321.84; 210/321.85; 210/417; 210/418; 210/420; 210/493.4
[58] Field of Search ......................... 210/321.69, 321.77, 210/321.86, 393, 411, 493.1, 493.3, 493.4, 636, 791, 797, 798, 321.75, 321.76, 321.84, 321.85, 417, 418, 420; 134/22.18, 22.19, 111, 166 R, 166 C, 56 R

[56] References Cited

U.S. PATENT DOCUMENTS 2,619,974 12/1952 Daley et al. .
3,970,560 7/1976 Metzger .
5,858,229 1/1999 Uemura et al. .

FOREIGN PATENT DOCUMENTS 0 819 466 1/1998 European Pat. Off. .
8-39018 2/1996 Japan .
1 535 832 12/1978 United Kingdom .
2 185 444 7/1987 United Kingdom .
97/37782 10/1997 WIPO .

OTHER PUBLICATIONS

Database WP1, Section PQ, Week 9616, Derwent Publications Ltd., London, GB; Class P43, AN 96–155498, XP002094026.

Primary Examiner—W. L. Walker
Assistant Examiner—David Sorkin
Attorney, Agent, or Firm—Kanesaka & Takeuchi

[57] ABSTRACT

A membrane separation device includes a washing apparatus and a membrane module. The washing apparatus is formed of a vessel for accommodating the membrane module therein, a first tank and a second tank for accommodating washing liquid for washing the membrane module in the vessel and connected to the vessel, a compressed gas feeding device connected to the first and second tanks for selectively feeding compressed gas into the first and second tanks to flow out the liquid therefrom, and conduits connected among the vessel, first and second tanks, and compressed gas feeding device. A conduit selecting device is attached to the conduits for feeding the washing liquid in one of first and second paths. In the first path, the compressed gas in the compressed gas feeding device is fed into the first tank, and the liquid in the first tank is fed into the vessel through the liquid inlet to wash the membrane module accommodated therein and is led to the second tank. In the second path, the compressed gas in the compressed gas feeding device is fed into the second tank, and the liquid in the second tank is fed into the vessel through the liquid inlet to wash the membrane module and is led to the first tank.

4 Claims, 5 Drawing Sheets winding direction

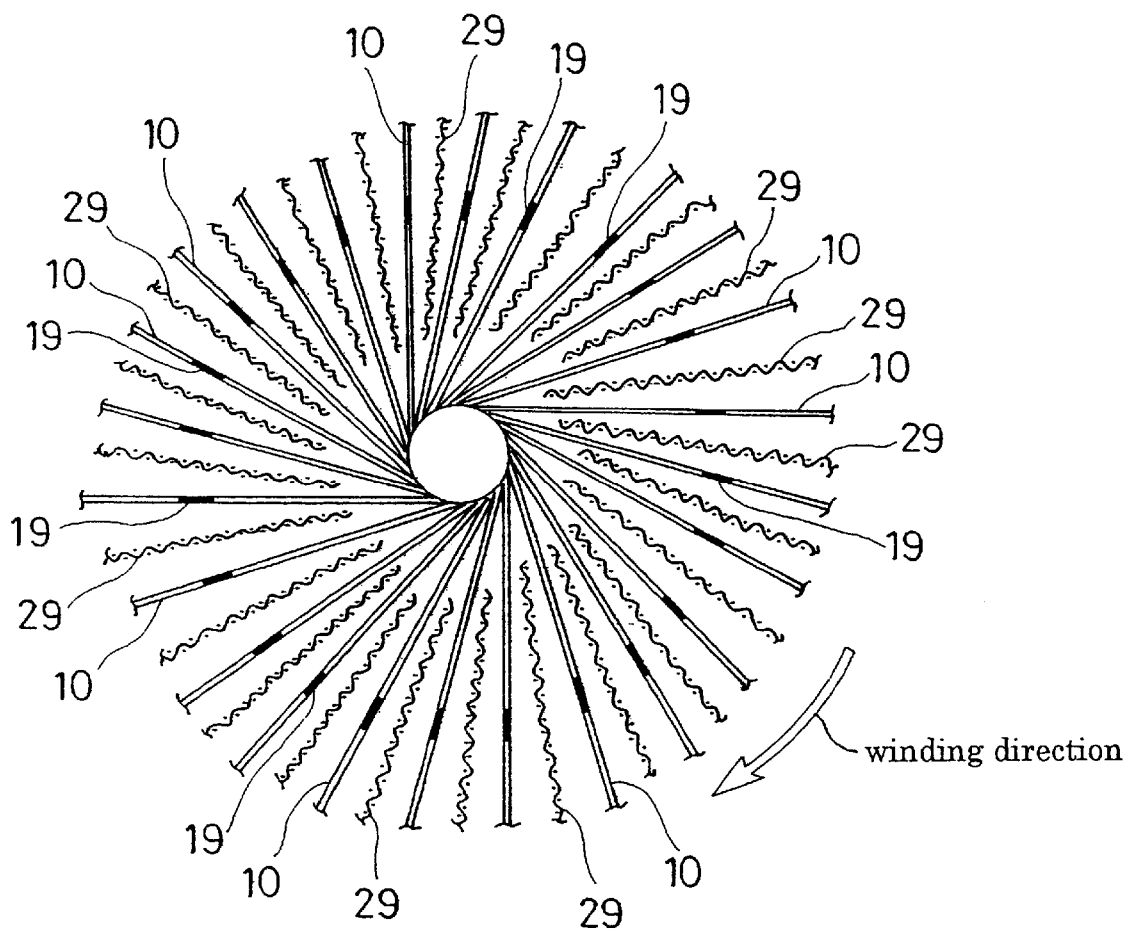

MEMBRANE SEPARATION DEVICE WITH MEMBRANE MODULE AND WASHING APPARATUS THEREFOR

BACKGROUND OF THE INVENTION

The present invention relates to a membrane separation device including a washing apparatus and a membrane module including a spiral wound type membrane module used in a membrane separation device such as a microfiltration device, ultrafiltration device, or reverse osmosis membrane separation device.

As a membrane module used for a membrane separation device, there has been known a spiral wound type membrane module in which separation membranes are wound around the outer circumference of a water collection pipe.

FIG. 5 is a perspective view, partly exploded, showing a structure of a conventional spiral wound type membrane module.

A plurality of envelope-like membranes 2 are wound onto a water collection pipe 1 with mesh spacers 3 being put between the membranes.

The water collection pipe 1 is provided with a slit-like opening for allowing the communication between the outside and the inside of the pipe. The membranes 2 are each formed in an envelope shape, inside of the membrane communicating with the inside of the water collection pipe 1. Inserted into each envelope-like membrane 2 is an inside spacer 4 such as mesh-like spacer, for forming a channel inside the membrane, so that the inside of the envelope-like membrane (hereinafter, sometimes referred to as just "membrane") 2 constitutes a permeated water channel.

The opposite ends of a roll 5 of the membranes 2 are provided with a top ring 6 and an end ring 7 at its flanges and brine seals 8 are fitted around the top ring 6 and the end ring 7.

Feed water flows from the front end of the membrane roll 5 into a feed water channel between the membranes 2 and further flows in the longitudinal direction of the membrane roll 5. Nonpermeated water is outputted from the rear end of the membrane roll 5. While the water passes in the feed water channels, the water permeates through the membranes 2 and flows into the pipe 1 and is taken out from the rear end of the pipe 1 as permeated water.

When the membrane module is fouled, it is cleaned by flowing permeated washing liquid or cleaning agents containing water into the permeated washing channels or the feed washing channels reversely. However, the conventional membrane module has required a large volume of permeated washing liquid or cleaning agents.

The conventional spiral wound type membrane module shown in FIG. 5 has also the following defects:

1) The water collection pipe 1 must have larger diameter to obtain a great flux within the pipe 1. However, this also makes the diameter of the spiral wound type membrane module larger.

2) The permeated water flows in each membrane spirally to the water collection pipe 1, so that a flow resistance increases in the membrane. A flow resistance is also high around the slit-like openings through which the permeated water flows from the inside of the membrane into the water collection pipe.

3) A volume of the feed water flowing in the feed water channels decreases as the feed water flows to the outlet by permeation into the envelope-like membranes, and a flow velocity of the feed water becomes small in a downstream region of the feed water channels whereby the membranes are to be fouled therearound.

OBJECT AND SUMMARY OF THE INVENTION

It is an object of the present invention to provide a washing apparatus for a membrane module capable of washing the membrane module sufficiently with a small volume of cleaning washing liquid and agents.

It is another object of the present invention to provide a washing apparatus suitable for a spiral wound type membrane module.

A washing apparatus for a membrane module of the present invention comprises a vessel for accommodating the membrane module, a first tank and a second tank respectively for accommodating washing liquid for washing the membrane module, a compressed gas feeding device capable of feeding compressed gas into the first and second tanks to flow out the liquid therefrom, and a conduit selecting device capable of selecting one of a first selection (path) and a second selection (path). In the first selection, compressed gas is fed into the first tank, the liquid in the first tank is fed into the vessel to wash the membrane module accommodated therein, and washing waste is led from the vessel to the second tank. In the second selection compressed gas is fed into the second tank, the liquid in the second tank is fed into the vessel to wash the membrane module, and washing waste is led from the vessel to the first tank.

When the membrane module is washed by the washing apparatus of the invention, the washing liquid in the first tank is fed into the vessel to wash the membrane module, and the vessel waste is led into the tank. After that, the liquid in the second tank is fed into the vessel to wash the membrane module.

The washing liquid is used repeatedly in the above manner, so that only a small volume of washing liquid is required.

In the present invention, the conduit selecting device may continue to feed compressed gas to the tank for a predetermined period of time even after the liquid in the tank is entirely fed into the vessel, whereby the membrane module in the vessel is washed not only by the liquid but also gas-liquid mixture.

BRIEF DESCRIPTION OF THE DRAWINGS

FIG. 1b is a sectional view taken along line B—B of FIG. 1a;

FIG. 1c is a sectional view taken along line C—C of FIG. 1a;

FIG. 2 is a sectional view illustrating a way of winding the membranes of a spiral wound type membrane module according to the embodiment;

DESCRIPTION OF THE PREFERRED EMBODIMENTS

Preferred embodiments of the invention will be described with reference to the drawings.

Figure 6:
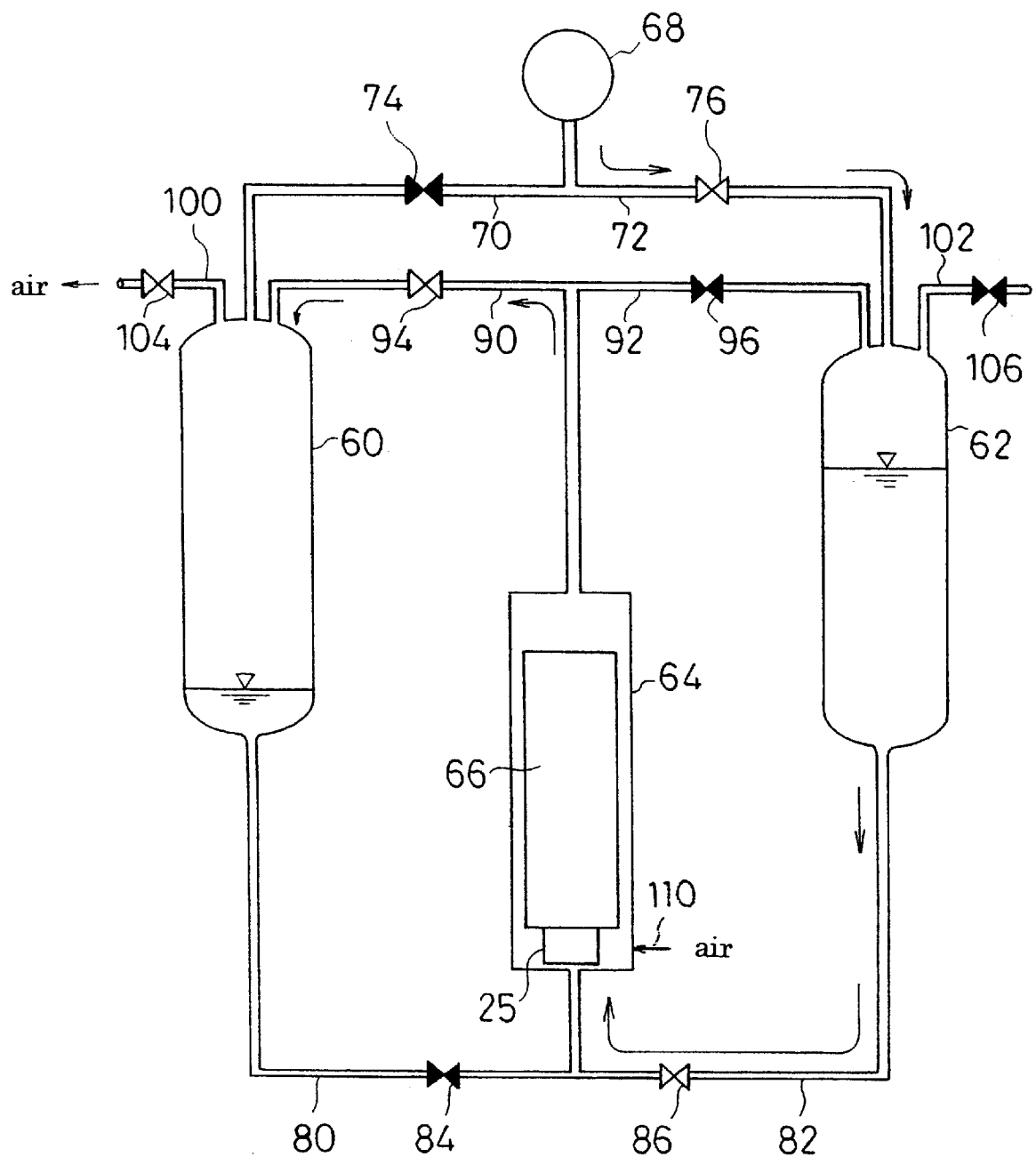
FIG. 6 is a sequential view of a washing apparatus for a membrane module according to the present invention.

FIG. 6 is a sequential view of the washing apparatus according to the embodiment of the invention. The washing apparatus comprises a vessel 64 accommodating a membrane module 66 therein, a first tank 60 and a second tank 62 respectively for accommodating washing liquid therein, and a compressor 68 for feeding compressed air to the tanks 60, 62.

The compressor 68 is communicated to upper portions of the tanks 60, 62 via pipes 70, 72 having valves 74,76 respectively, and lower portions of the tanks 60,62 are communicated to a lower portion of the vessel 64 via pipes 80, 82 having valves 84,86.

An upper portion of the vessel 64 is communicated to the upper portions of the tanks 60, 62 via pipes 90, 92 having values 94, 96. Air bleeding pipes 100, 102 having valves 104, 106 are connected to the upper portions of the tanks 60,62.

The membrane module 66 is of a spiral wound type having envelope-like membranes wound spirally to form a roll as described later with reference to FIGS. 1a to 4. Feed water flows from an upper end thereof in the drawings into feed water channels formed between envelope-like membranes.

Nonpermeated water flows out from a central region (inside a socket 25) of a lower end thereof in the drawings, and permeated washing liquid flows from a peripheral region outside the socket 25.

In a state shown in FIG. 6, washing liquid in the tank 62 is being fed into the vessel 64 to wash the membrane module 66, and washing waste therefrom is being led into the tank 60. Namely, after the valves 76, 86, 94, 104 are opened, and the valves 74, 84, 96, 106 are closed, the compressor 68 starts to operate to feed compressed air into the tank 62 and the surface of the washing water is pressed by the air. In accordance with this, the washing liquid in the tank 62 is fed to the lower portion of the vessel 64, flows from the inside of the socket 25 into the feed washing channels of the membrane module 66, flows upwardly in the channels, flows out from the uppermost end of the module 66, and then flows into the tank 60 via the pipe 90.

When the washing operation is kept with time, the tank 62 becomes vacant and air is fed to the vessel 64 whereby the membrane module 66 is washed by air-liquid mixture. The residual liquid in the membrane module 66 is then pushed out entirely therefrom. It is preferable to keep air fed thereinto for a predetermined period of time.

It is also preferable that a device 110 for feeding compressed air to the permeated washing channels of the module 66, and the permeated washing channels are washed by air after the feed washing channels are washed by air.

After that the open and closed state of each valve is revered, so that the washing liquid in the tank 60 is fed into the lower portion of the vessel 64, wash the module 66 and then flows into the tank 62.

Namely, after the valves 76, 86, 94, 104 are closed, and the valves 74, 84, 96, 106 are opened, the compressor 68 starts to operate to feed compressed air into the tank 60 and the surface of the washing water is pressed by the air. In accordance with this, the washing liquid in the tank 60 is fed to the lower portion of the vessel 64, flows from the inside of the socket 25 into the feed washing channels of the membrane module 66, flows upwardly in the channels, flows out from the uppermost end of the module 66, and then flows into the tank 62 via the pipe 92.

When the washing operation is kept with time, the tank 60 becomes vacant and air is fed to the vessel 64 whereby the membrane module 66 is washed by air-liquid mixture. The residual liquid in the membrane module 66 is then pushed out entirely therefrom. It is preferable to keep air fed thereinto for a predetermined period of time.

It is also preferable that the permeated washing channels are washed by air after the feed washing channels are washed by air.

If necessary, the above washing cycle is repeated to wash the membrane module sufficiently.

According to the washing apparatus, since the washing liquid is circulated between the tanks 60, 62 and used for washing repeatedly as described above, the washing liquid is required in a small volume. As the washing liquid, almost the same volume as that of the vessel 64 is enough.) A direction of the liquid between the tanks 60, 62 is quite easy to be reversed only by reversing the open and closed state of each value. The membrane module is washed sufficiently by liquid, air-liquid mixture.

Though the washing liquid is fed into the feed water channels of the membrane module 66 in the embodiment shown in FIG. 6, the washing liquid may be fed into the permeated water channels whereby the washing waste is flown out from the feed water channels.

Various gases including nitrogen and argon may be employed instead of air as used in the above embodiment. Various kinds of washing liquid such as water, liquidous cleaning agents, water solution of a cleaning agent can be used in the present invention.

Preferable embodiments of the spiral around type membrane module 66 will be described hereafter with reference to FIGS. 1a to 4.

Figure 1A:
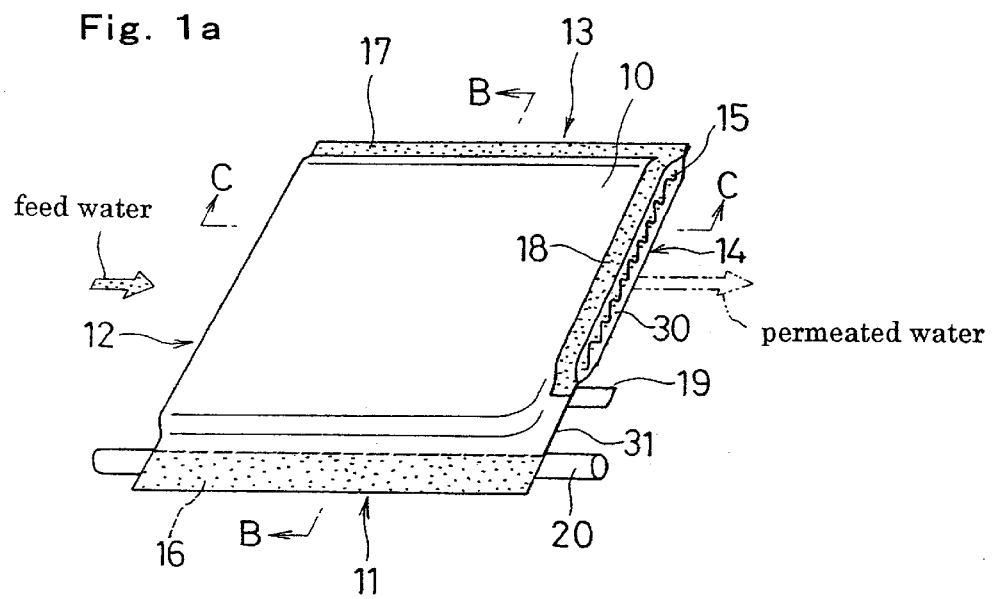
FIG. 1a is a perspective view showing one of envelope-like membranes suitable for being washed by an apparatus according to an embodiment.
Figure 1B:
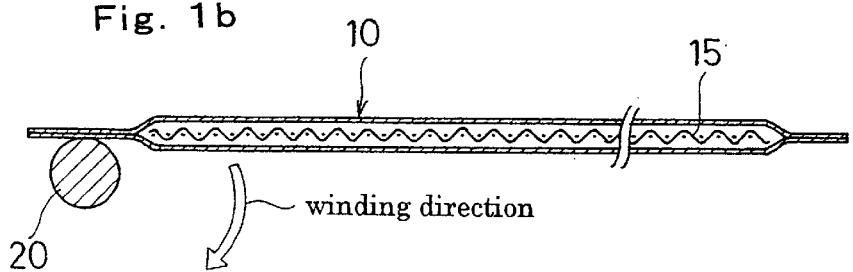
Figure 1C:
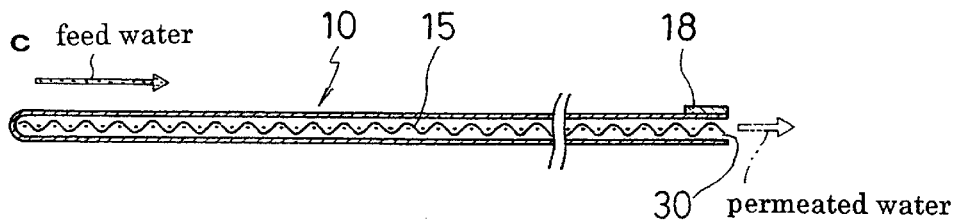
Figure 3:
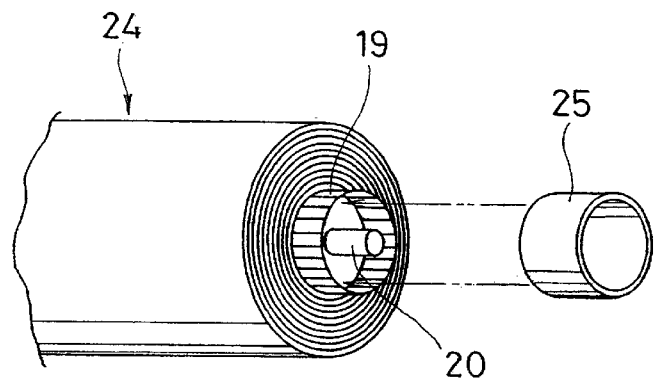
FIG. 3 is a perspective view showing the engagement between the membrane roll and a socket.
Figure 4:
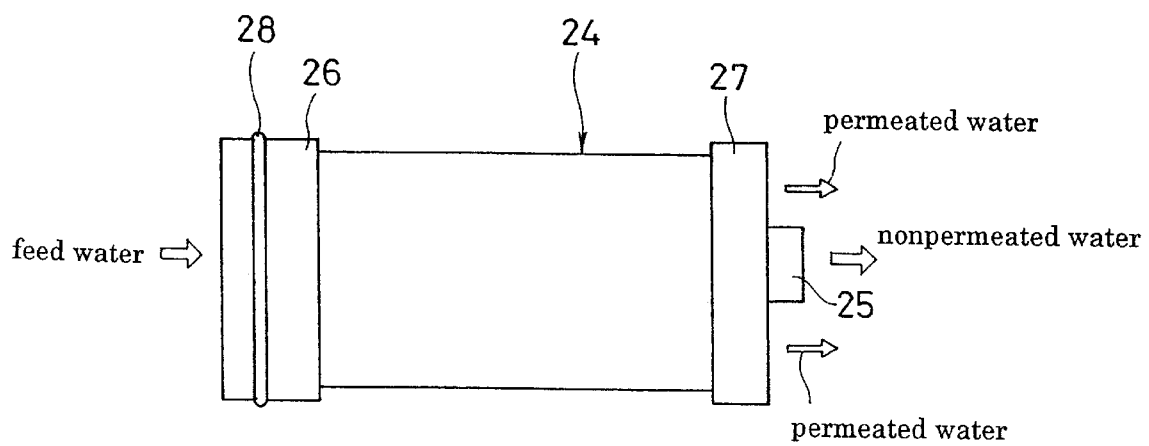
FIG. 4 is a side view of the spiral wound type membrane module according to the embodiment.
Figure 5:
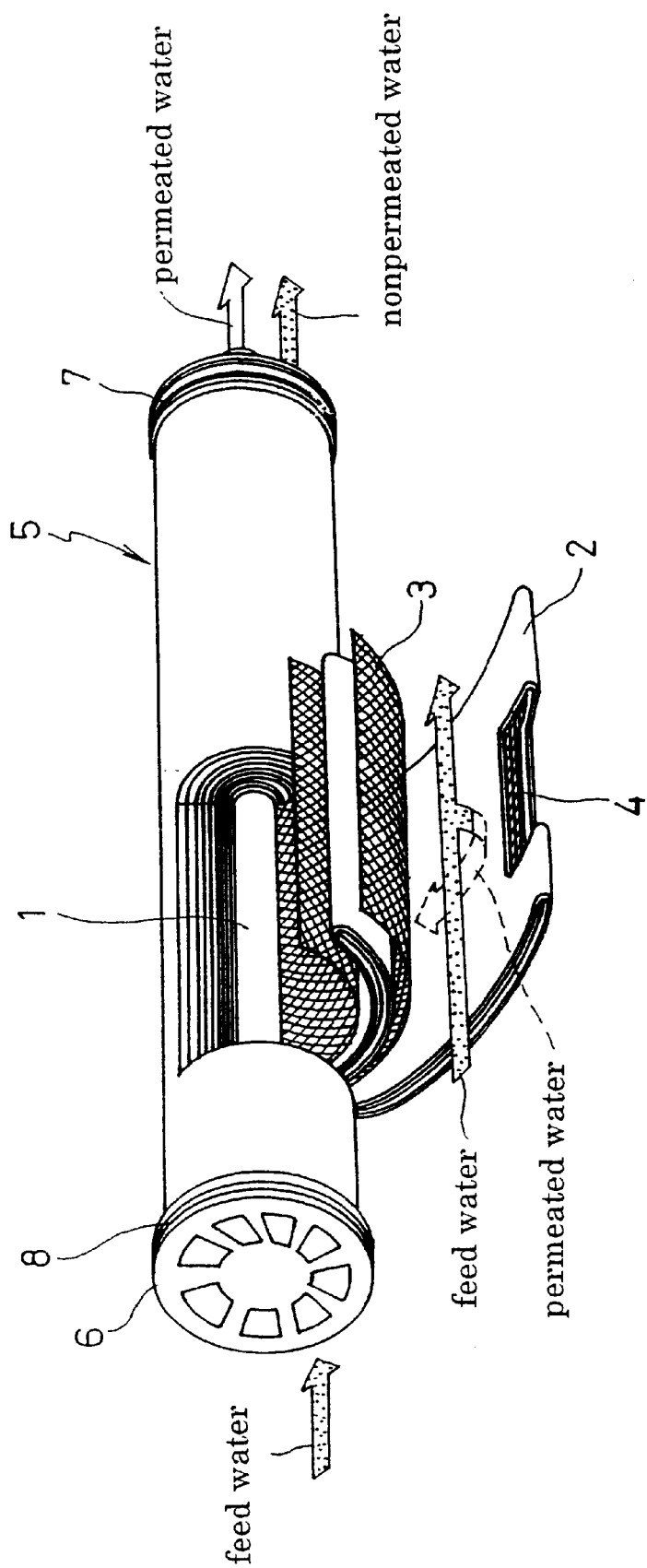
FIG. 5 is a perspective view showing the structure of a conventional spiral wound type membrane module.

FIG. 1a is a perspective view showing one of envelope-like membranes and a shaft onto which the membranes are wound, which are used in a spiral wound type membrane module of an embodiment of the present invention. FIGS. 1b and 1c are sectional views taken along line B—B and line C—C of FIG. 1a, respectively. FIG. 2 is a sectional view illustrating a way of winding the membranes around the circumference of the shaft, FIG. 3 is a perspective view showing the engagement between the membrane roll and a socket, and FIG. 4 is a side view of the spiral wound type membrane module.

Each envelop-like membrane 10 according to this embodiment is formed in a square or rectangle having a first edge 11, a second edge 12, a third edge 13, and a fourth edge 14. The membrane 10 comprises a long sheet of membrane film which is folded at the second edge 12 into two halves which are bonded to each other along the first edge 11 and the third edge 13 with adhesives and are not bonded to each other to have an opening along a part of the fourth edge 14 to form an envelope shape.

The halves of the membrane film are not bonded to each other along a part of the fourth edge 14 from a halfway of the fourth edge 14 to the third edge 13 to form an outlet 30 for permeated water. The halves of the membrane film are bonded to each other along a rest of the fourth edge 14 from the halfway of the fourth edge 14 to the first edge 11 so as to form a blocking part 31 for blocking the flow of the permeated water.

Disposed inside the membrane 10 is a spacer (for example, a mesh spacer) 15 for forming a channel inside the membrane 10. Instead of a sheet of membrane film 10 which is folded at the second edge 12 into two halves, two membrane films may be used. In this case, the membrane films are bonded along the first edge 11, the second edge 12, the third edge 13, and a part of the forth edge 14 to each other.

Adhesive 16 is applied to one surface of the membrane 10 and adhesives 17, 18 are applied to the other surface of the membrane 10. A plurality of such membranes 10 are wound around the circumference of a shaft 20 to form a membrane roll. The adhesive 16 is applied along the first edge 11 and the adhesive 17 is applied along the third edge 13. The adhesive 18 is applied from the half way of the fourth edge 14 to the third edge 13 along the outlet 30 for permeated water.

Upon winding the plurality of membranes 10 onto the shaft 20, the membranes 10 superposed on each other are watertightly bonded to each other at portions where the adhesives 16, 17, 18 are applied. Therefore, a feed water channel is formed between every adjacent two of the membranes 10, 10. As the adhesive 18 sets, on the rear end of the membrane roll, an outlet for raw water (nonpermeated water) is formed inside and a blocking part for blocking the flow of raw water is formed outside.

Each fin 19 is disposed to extend backward from a boundary between the outlet 30 for permeated water and the blocking part 31 for blocking the flow of permeated water. The fin 19 may be made of a synthetic resin film or sheet and is preferably bonded to the membrane 10 with adhesives.

The membranes 10 are wound around the circumference of the shaft 20 by way of mesh spacers 29 as shown in FIG. 2 so as to form the membrane roll 24 as shown in FIG. 3. The fins 19 project from the rear end of the roll 24. The fins 19 are disposed at the same portions on the fourth edges 14 of the respective membranes 10 in such a manner that the fins 19 are positioned apart from the axis of the roll 24 at the same distance in the radial direction and the fins 19 are partly superposed on each other so as to constitute a ring-like protrusion. Inserted into the ring-like protrusion is the rear end of a cylindrical socket 25. The socket 25 and the fins 19 are then bonded to each other by adhesives. The socket 25 may be fitted to the outside of the protrusion made by the fins 19. Instead of the fins 19, the roll 24 may be provided with a slit formed at a portion corresponding to the fins 19 by a lathe and the socket 25 may be embedded into the slit.

The socket 25 and the fins 19 are bonded to each other so that the rear end of the roll 24 is divided into an outlet area for permeated water outside the socket and an outlet area for nonpermeated water inside the socket 25.

Before winding the membranes 10 onto the shaft 20, mesh spacers 29 are disposed between the membranes 10 as shown in FIG. 2. By disposing the mesh spacers 29 between the membranes 10, the feed water channel is formed.

As shown in FIG. 4, a top ring 26 and an end ring 27 are formed at both ends of the roll 24 by synthetic resin molds or the like and brine seal 28 is fitted to the periphery of the top ring 26.

In the thus constituted spiral wound type membrane module, feed water is supplied from the front end of the roll 24 into the feed water channel between the membranes 10 as shown in FIG. 4. The feed water flows in the channel in the direction almost parallel to the axis of the roll 24 and is then taken out from the area inside the socket 25 at the rear end of the roll 24. While feed water flows in the feed water channels in this manner, the water permeates through the membranes 10 so that the permeated water is taken out from the area outside the socket 25 at the rear end of the roll 24.

In this module, since the permeated water flows through the membranes 10 in the direction parallel to the axis of the roll 24 and is taken out from the rear end, a water collection pipe used in a conventional spiral wound type membrane module is no longer necessary. Therefore, this can avoid the flowing resistance of the water when flowing from the membranes into the water collection pipe, thereby significantly reducing the flowing resistance of the permeated water.

As the water collection pipe can be eliminated, the length of the membrane 10 can be increased in the winding direction so as to increase the membrane area. Even with the membrane having increased length in the winding direction, the flowing resistance of the permeated water is not increased. This allows greater flux to be obtained.

The outlet area of the raw water channel is only positioned inside the socket 25. That is, the module has such a structure that the outlet of the feed water channel (i.e. the downstream) is narrowed. Therefore, high flow rate of feed water (nonpermeated water) is obtained even in the downstream of the feed water channel, thereby preventing the fouling at the downstream of the feed water channel. The areas inside and outside the socket 25 (the length of the adhesive 18 along the fourth edge 14) are preferably decided corresponding to the rate of permeated water collection in this spiral wound type membrane module.

Since the socket 25 is connected to the roll 24 by using the fins 19, the bond strength between the socket 25 and the roll 24 is high. The outlet area for permeated water and the outlet area for nonpermeated water are watertightly divided from each other by the socket 25.

Though the outlet area for permeated water is disposed outside the socket 25 and the outlet area for nonpermeated water is disposed inside the socket 25 in this embodiment of FIGS. 1a to 4, conversely the outlet area for permeated water may be disposed inside the socket 25 and the outlet area for nonpermeated water may be disposed outside the socket 25.

As mentioned above, in the washing apparatus for a membrane module of the present invention, the membrane module can be washed sufficiently with a small volume of washing water and cleaning agents. Washing by liquid, washing by air-liquid mixed fluid, and washing by gas including air may be performed simultaneously or sequentially in the present invention.

What is claimed is:

1. A membrane separation device comprising a membrane module and a washing apparatus for washing said module, said module being a spiral wound type membrane module and comprising a plurality of membranes having a form of an envelope, permeated water spacers for forming permeated water channels disposed inside the membranes, feed water spacers for forming feed water channels disposed between the membranes, and a shaft, each membrane being formed in a substantial rectangle having first, second, third and fourth sides, the first, second and third sides being closed, and the fourth side being partly opened to have an opening and closed at a rest thereof to have a blocking portion, the membranes being wound onto the shaft of the module to form a membrane roll so that the first sides perpendicular to the fourth sides are in contact with the shaft and the fourth sides are exposed on a rear end of the membrane roll, and the second sides opposite to the fourth sides are exposed on a front end of the membrane roll, and each feed water channel between the membranes being closed entirely along the third side, closed to have a blocking portion along a portion of the fourth side corresponding to the opening of the membrane, and opened along a portion of the fourth side corresponding to the blocking portion of the membrane, said washing apparatus comprising:

a vessel for accommodating the membrane module therein, said vessel having a liquid inlet, a first tank and a second tank for accommodating washing liquid for washing the membrane module in the vessel, said first and second tanks being connected to the vessel, a compressed gas feeding device connected to the first and second tanks for selectively feeding compressed gas into the first and second tanks to flow out the liquid therefrom, conduits connected among the vessel, first and second tanks, and compressed gas feeding device, and conduit selecting means attached to the conduits for feeding the washing liquid in one of first and second paths so that in the first path, the compressed gas in the compressed gas feeding device is fed into the first tank, and the liquid in the first tank is fed into the vessel through the liquid inlet to wash the membrane module accommodated therein and is led from the vessel to the second tank; and in the second path, the compressed gas in the compressed gas feeding device is fed into the second tank, and the liquid in the second tank is fed into the vessel through the liquid inlet to wash the membrane module and is led to the first tank.

2. A membrane separation device as claimed in claim 1, wherein said conduit selecting means is designed to continuously feed compressed gas to one of the tanks for a predetermined period of time after the liquid in said one of the tanks is entirely fed to the vessel, and feed the compressed gas from said one of the tanks to the vessel.

3. A membrane separation device as claimed in claim 1, further comprising a second compressed gas feeding device attached to the vessel near the liquid inlet to provide compressed air to the vessel.

4. A membrane separation device as claimed in claim 1, wherein said conduits include a first conduit situated between the compressed gas feeding device and the first tank, a second conduit situated between the compressed gas feeding device and the second tank, a third conduit situated between the first tank and an outlet of the vessel, a fourth conduit situated between the second tank and the outlet of the vessel, a fifth conduit situated between the first tank and the inlet of the vessel, and a sixth conduit situated between the second tank and the inlet of the vessel.

* * * * *